May 25, 1926.
T. BARTY ET AL
BRAKE VALVE DEVICE
Filed August 20, 1924
1,585,819
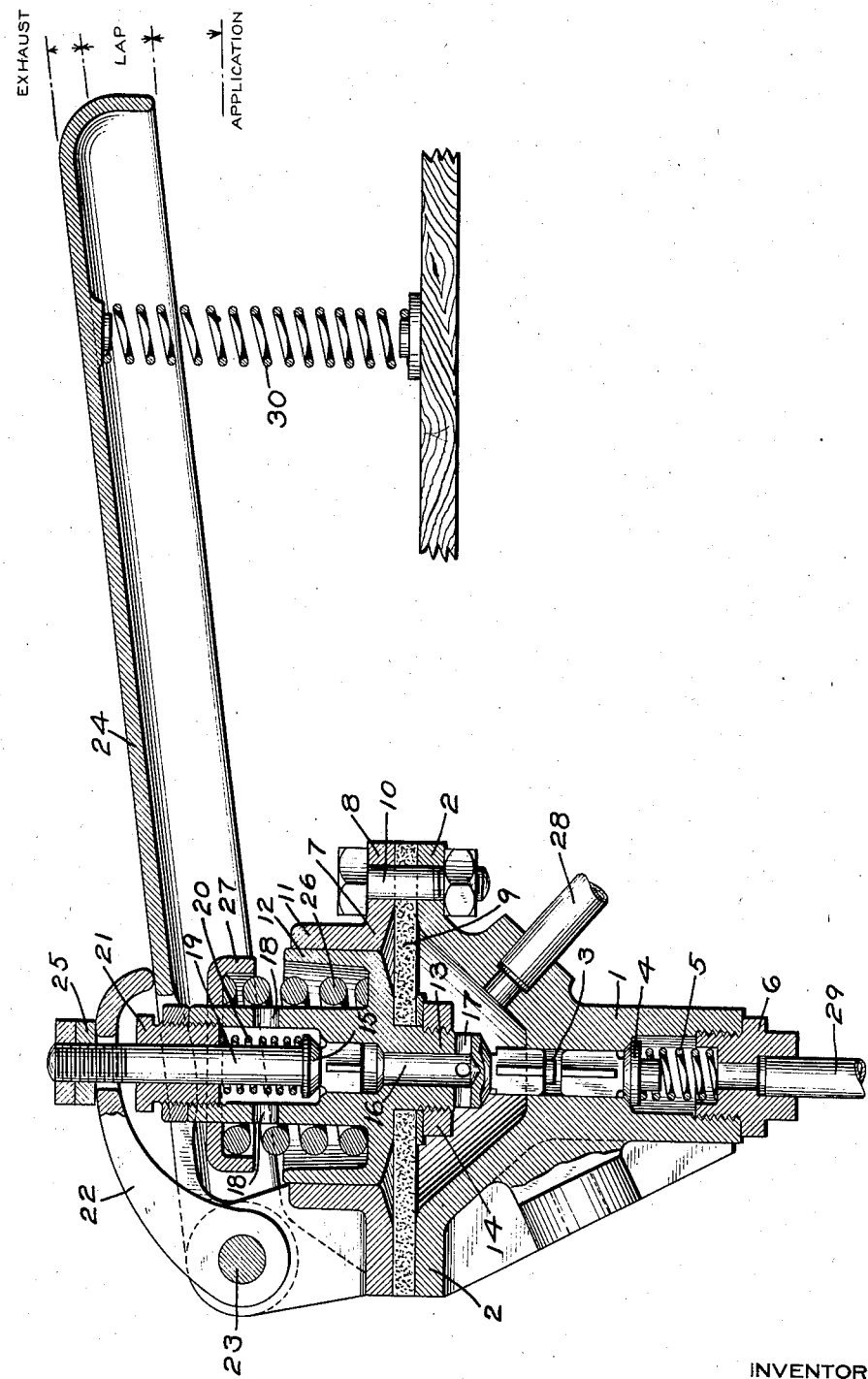
INVENTORS
THOMAS BARTY
AND
FRANK A. BURROWS
BY
Wm. M. Cady
ATTORNEY Patented May 25, 1926.

1,585,819

UNITED STATES PATENT OFFICE.

THOMAS BARTY AND FRANK A. BURROWS, OF LONDON, ENGLAND, ASSIGNORS TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed August 20, 1924. Serial No. 733,085.

This invention relates to brake valves for fluid pressure braking apparatus, and has for its object to provide an improved pedal operated brake valve device for controlling the fluid pressure brakes, particularly of a motor vehicle.

In the accompanying drawing, the single figure is a sectional view of a brake valve device embodying our improvement.

The improved brake valve device may comprise a hollow body portion 1, having a horizontal flange 2 at its upper end. The lower end of the body portion is traversed by an axial passage 3, in which is located an inlet valve 4 of the poppet type adapted to cooperate with a valve seat formed at the upper end of an enlarged section of the axial passage 3.

The inlet valve 4 is normally held in engagement with its valve seat by means of a coil spring 5, interposed between the lower end of the valve and the upper end of an inlet nipple screw 6, which is threaded into the lower end of the enlarged section of the axial passage 3.

The upper end of the body portion 1 is closed by a cover 7 having a flange 8. A flexible diaphragm 9 is interposed between the flanges 2 and 8 and the flanges are secured together by bolts 10.

The cover 7 is provided with an upwardly extending annular flange 11 which serves as a guide for a piston 12 having a stem 13 extending downwardly through the diaphragm 9 and secured thereto by a nut 14. The stem 13 of the piston 12 also extends upwardly in the form of a tubular element, the interior of which contains at its lower end an exhaust valve 15 of the poppet type. The exhaust valve 15 cooperates with a valve seat formed in the piston stem and controls communication between the interior of the tubular element and an axial passage 16 formed in the lower valve stem and terminating in one or more apertures 17 opening into the interior of the valve body, below the diaphragm 9.

The interior of the tubular element above the exhaust valve 15 is open to the atmosphere through ports 18 and the exhaust valve is provided with an upwardly extending stem 19, surrounded by a coil spring 20, tending to maintain the valve 15 seated. The spring 20 is interposed between the valve 15 and the lower end of a screw plug 21, the stem 19 projecting through said plug.

The upper end of the exhaust valve 15 also loosely passes through an aperture in one end of a curved member 22, the opposite end of which is pivotally mounted on the cover plate 7. On the pivot pin 23 of the member 22, one end of an operating pedal 24 is supported, said pedal being adapted to engage in its raised position with the underside of the curved member 22 and thus raise the exhaust valve stem 19 by means of a nut 25 applied to the upper end of the stem.

The tubular element of piston 12 is surrounded by a coil spring 26 interposed between the piston 12 and a flanged collar 27, which loosely surrounds said tubular element and is arranged on the underside of the pedal 24.

The interior of the valve body 1 below the diaphragm 9 communicates through a pipe 28 with a brake chamber of the braking apparatus, and the inlet nipple 6 is connected through pipe 29 with a reservoir or other source of fluid under pressure.

In operation, when the pedal 24 is in its normal or raised position in which it is maintained by a coil spring 30, interposed between the pedal and the floor of the vehicle, the pedal serves to maintain the member 22 in its upper position in which it raises the exhaust valve 15, clear of its seat against the action of its spring 20. As a result, the brake chamber or brake cylinder (not shown) is vented to the atmosphere through pipe 28, the ports 17, axial passage 16 and the exhaust ports 18.

In order to apply the brakes, the pedal 24 is depressed, thus permitting the member 22 to descend and the exhaust valve 15 to seat under the action of spring 20. The continued depression of pedal 24 then causes the under face of the pedal to engage the collar 27 and thereby effect the compression of spring 26. As a result, the piston 12 moves downwardly until the lower extended end of the stem 13 engages the upper end of the inlet valve 4 which is then moved from its seat against the action of spring 5.

Fluid under pressure is now admitted from the source of fluid under pressure through pipe 29 to the chamber below diaphragm 9 and is thence supplied through pipe 28 to the brake chamber to effect an application of the brakes.

As soon as the pressure in the brake chamber attains a value corresponding with the degree to which the spring 26 is compressed by the depression of the pedal 24, the fluid pressure acting on the underside of the diaphragm 9 will operate to raise the diaphragm, together with piston 12, thus permitting the inlet valve 4 to seat and prevent the further supply of fluid to the brake chamber.

If a higher brake pressure is desired, the pedal 24 is further depressed, thus causing the inlet valve 4 to be again opened and then afterward closed, when the brake pressure has been correspondingly increased.

In order to release the brake, the pedal 24 is released and allowed to return to its normal position, whereupon the member 22 will be operated to open the exhaust valve 15 and permit the release of fluid from the brake chamber.

The action of the spring 20 can be adjusted by means of the plug 21 so that the pressure with which the valve 15 is held closed during an application of the brakes can be regulated, as desired.

In the event of the pressure in the brake chamber exceeding that for which the spring 20 may be adjusted, the exhaust valve 15 will be opened and this will prevent an excessive brake pressure from being developed.

Having now described our invention, what we claim as new and desire to secure by Letters Patent, is:—

1. A brake valve device for controlling the admission of fluid under pressure to and its exhaust from a brake chamber and including an exhaust valve operated at a predetermined pressure in the brake chamber for releasing fluid from the brake chamber.

2. A brake valve device for controlling the admission of fluid under pressure to and its exhaust from a brake chamber and including an exhaust valve subject to the opposing pressures of the brake chamber and a spring and operated to vent fluid from the brake chamber in excess of the setting of the spring.

3. A brake valve device for controlling the admission of fluid under pressure to and its exhaust from a brake chamber and including an exhaust valve for controlling the exhaust of fluid from the brake chamber and subject to the opposing pressures of the brake chamber and a spring whereby the valve is opened to vent fluid from the brake chamber upon a predetermined increase in pressure in the brake chamber.

4. A brake valve device for controlling the admission of fluid under pressure to and its exhaust from a brake chamber and including a release valve, a spring tending to close said valve, a spring, and manually operable means actuated by said spring upon release of said means by the operator for lifting said valve from its seat.

5. A brake valve device for controlling the admission of fluid under pressure to and its exhaust from a brake chamber and including a release valve, a spring tending to close said valve, a member operatively connected to said valve, a spring, and an operating lever actuated by said spring upon release of the lever by the operator for operating said member to open said valve.

6. A brake valve device for controlling the admission of fluid under pressure to and its exhaust from a brake chamber and including an exhaust valve for releasing fluid from the brake chamber in releasing the brakes and operated when the brakes are applied to vent fluid from the brake chamber upon a predetermined increase in pressure in the brake chamber.

7. A brake valve device comprising a casing, a flexible diaphragm in said casing, a fluid inlet valve controlled by said diaphragm, an exhaust valve, and a member movable with said diaphragm and containing the seat for said exhaust valve.

8. A brake valve device comprising a casing, a flexible diaphragm in said casing, a fluid inlet valve controlled by said diaphragm, an exhaust valve, a spring acting on said exhaust valve tending to seat same, and a member movable with said diaphragm and containing the seat for said exhaust valve.

9. A brake valve device comprising a casing, a flexible diaphragm in said casing, a spring acting on said diaphragm, a fluid inlet valve controlled by said diaphragm, an operating lever acting on said spring, an exhaust valve, a member associated with said diaphragm and having a seat for said exhaust valve, a spring tending to seat said exhaust valve, and an arm operated by said lever for opening said exhaust valve.

In testimony whereof we have hereunto set our hands.

THOMAS BARTY.
FRANK A. BURROWS.